(12) United States Patent
Slaunwhite et al.

(10) Patent No.: US 10,812,447 B2
(45) Date of Patent: Oct. 20, 2020

(54) REGISTRY DOMAIN NAME MANAGEMENT

(71) Applicant: Canadian Internet Registration Authority, Ottawa (CA)

(72) Inventors: Donald Slaunwhite, Kanata (CA); Xiaoping Jie, Nepean (CA); Tongfeng Zhang, Kanata (CA)

(73) Assignee: Canadian Internet Registration Authority, Ottawa (CA)

( * ) Notice: Subject to any disclaimer, the term of this patent is extended or adjusted under 35 U.S.C. 154(b) by 113 days.

(21) Appl. No.: 15/730,385

(22) Filed: Oct. 11, 2017

(65) Prior Publication Data

US 2018/0103008 A1    Apr. 12, 2018

Related U.S. Application Data

(60) Provisional application No. 62/406,772, filed on Oct. 11, 2016.

(51) Int. Cl.
*H04L 29/12* (2006.01)
*G06Q 30/06* (2012.01)
*G06Q 30/02* (2012.01)

(52) U.S. Cl.
CPC ..... *H04L 61/3025* (2013.01); *G06Q 30/0207* (2013.01); *G06Q 30/06* (2013.01); *H04L 61/15* (2013.01); *H04L 61/1511* (2013.01); *H04L 61/20* (2013.01); *H04L 61/302* (2013.01); *H04L 61/3005* (2013.01)

(58) Field of Classification Search
CPC .................................................. H04L 61/3025
See application file for complete search history.

(56) References Cited

U.S. PATENT DOCUMENTS

| | | | | |
|---|---|---|---|---|
| 2011/0016022 A1* | 1/2011 | Essawi | ............... | G06Q 30/0283 705/26.25 |
| 2015/0134832 A1* | 5/2015 | Gould | ................. | H04L 61/1511 709/226 |

* cited by examiner

*Primary Examiner* — Andrew C Georgandellis
(74) *Attorney, Agent, or Firm* — Procopio, Cory, Hargreaves & Savitch LLP

(57) ABSTRACT

Methods and systems for managing domain names are disclosed. A server hosts a platform that interfaces with users. The server is operably coupled to the registry and domain management database, and receives transaction requests to assign tags to one or more domain names, the tags used as identifiers to associate information with the domain names. The server stores the domain names with one or more tags and associated information in the domain management database. The server receives a request to perform a registry event on a domain name and checks if there are tags associated with the domain name of which the event was requested. If there is no assigned tag the server performs the registry event action. If there is an associated tag the server complies with the tag and associated tag information.

20 Claims, 14 Drawing Sheets

REGISTRY DOMAIN NAME MANAGEMENT

CROSS-REFERENCE TO RELATED APPLICATIONS

This application claims priority from U.S. Provisional Application No. 62/406,772 filed Oct. 11, 2016 the entirety of which is hereby incorporated by reference for all purposes.

TECHNICAL FIELD

This disclosure relates generally to website domain names, and in particular to a method and system for Registry administration and management of website domain names.

BACKGROUND

Businesses and users that want to have an online presence require domain names which are associated with an Internet Protocol (IP) address of a website. IP is the communications protocol underlying the Internet that allows networks of devices to communicate over a variety of physical links. The Domain Name System (DNS) catalogs domains and IP addresses associated with web hosts. When a user wants to visit a website for example located at a specific IP address, instead of using a 32-bit IP address (as with IP Version 4) or a 128-bit IP address (as with IP Version 6), the user can enter the more user-friendly canonical name (CNAME) to locate the devices and services for example www.website.com.

Domain names are comprised of the second level domain (SLD) and the top-level domain (TLD). The TLD is at the top of the DNS naming hierarchy and appears in domain names as the string of letters following the last (rightmost) "dot" symbol ".". By way of illustration, with the example www.website.com, "website" is the SLD, and ".com" is the TLD. TLDs are mainly classified into two categories: generic TLDs (gTLDs) (for example ".com"), and country-code top level domains (ccTLDs), (for example ".ca" for Canada). The Internet Corporation for Assigned Names and Numbers (ICANN) is an internationally organized non-profit corporation that has responsibility for IP address space allocation, protocol identifier assignment, gTLD and ccTLD name system management, and root server management.

TLDs are allocated to registries, the authoritative, master database of all domain names and the associated information that allows third party entities to request administrative control of a domain name. For example, the Canadian Internet Registration Authority (CIRA) manages the ".ca" ccTLD for Canada. A registrant is the entity that registers and uses a domain name. A registrant typically cannot purchase and register a domain name directly from the registry. Instead, registrants purchase and register domain names from registrars. Registrars are commercial entities that manage the registration, and management of domain names. Registrars can be considered to be the channel or resellers of registries. A registrant registers a domain name through a registrar by choosing the domain name, and providing various contact and technical information to the registrar, who then submits the details of the domain name, and the contact and technical information to the registry. The registrar charges the registrant directly for the registration of the domain name. In turn, the registry charges the registrars a wholesale price for the registration of the domain name. Each registry has a different wholesale price that it charges to its registrars, depending on the TLD. In this regard, if the registrant is the end user customer, the registrar can be viewed as the retailer, and the registry can be viewed as the wholesaler.

Domain names have historically been sold by registrars to registrants for a set price, regardless of the domain name being registered. However, domain names can be considered to be a form of online real estate. Due to the finite number of domain names and the constant push by businesses to maintain their online presence, this has resulted in an after-market, or secondary market for domain names, with some domain names selling at significant prices above their initial registration fee. For example, short domain names, or domain names incorporating generic words, are often valuable and have been sold between registrants for significant prices above their initial registration fee. This has led to some registrars charging premium prices to their registrants for valuable domain names being registered. In other words, if a registrar considers a particular domain name to be valuable, it will charge the registrant a higher fee for the registration of that domain name, compared to the registration of a "normal" domain name. Notwithstanding the higher prices charged to the registrants, registries have historically charged their registrars the same wholesale price for all domain names, regardless of whether the domain name is considered to be valuable and can be sold for a higher price by the registrar at the retail level.

Traditional registry systems were designed as very simple data entry tools which have very limited functionality. Currently, these systems allow only one set of prices for the registry to sell domain names to their registrars, regardless of the domain name being registered. Even modern systems which may allow for unique domain name pricing require that those details are managed in database tables with values that are hard-coded for each instance or quite often handled in a manual offline process. If a registry wants to change metadata associated with a domain name, they must do so manually. As most registry companies are also very small, this often requires hiring a back-end manager to update the database tables.

Such limitations make it difficult for registries to manage growing the domain registry and to adjust prices of domain names based on demand fluctuations, leaving them unable to take part in the potential upsides of this increasingly competitive domain industry. Accordingly, more advanced forms of domain name management is highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
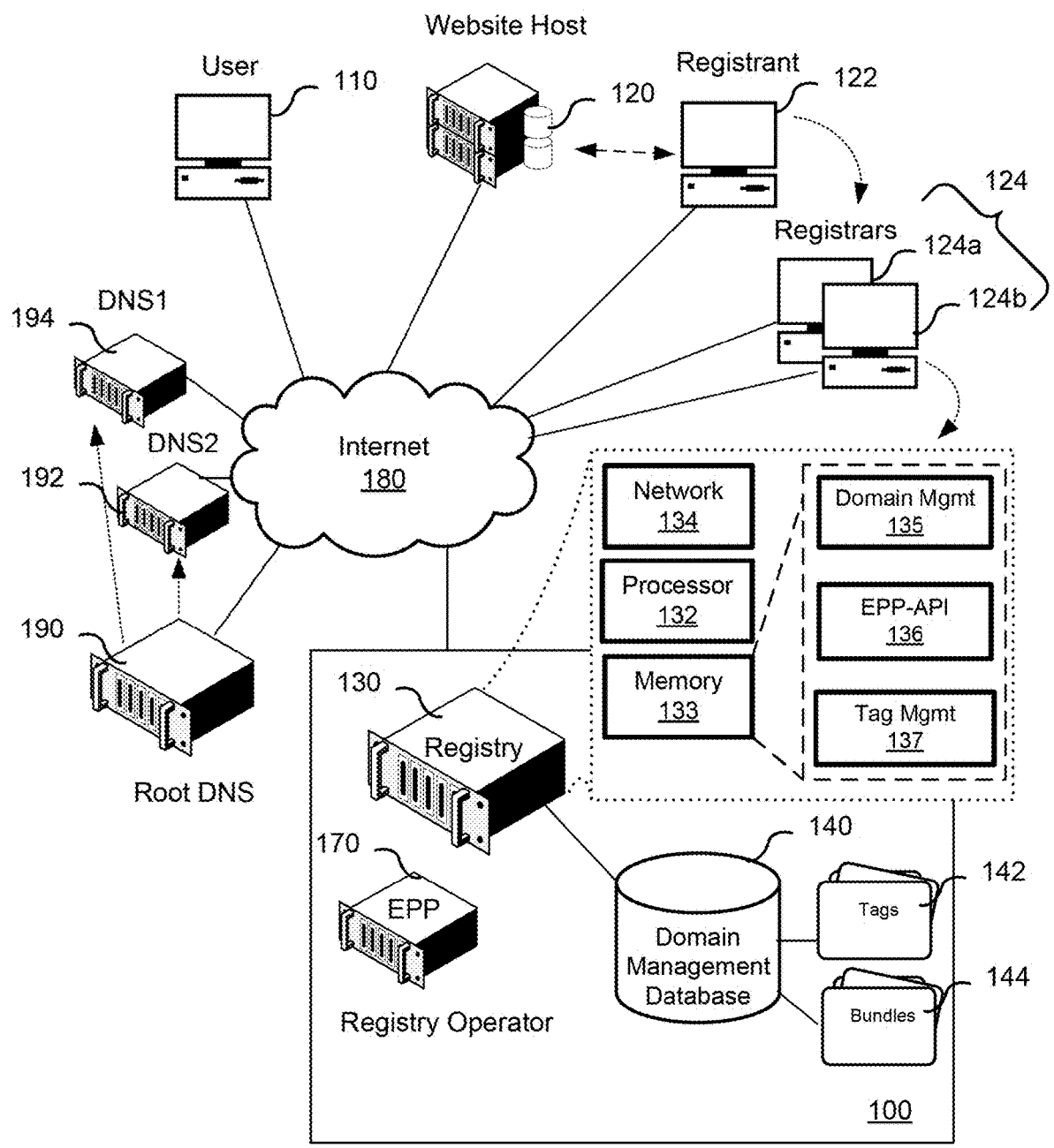
FIG. 1 shows an overview of a domain name management system.

The invention will now be described in detail with reference to various embodiments thereof as illustrated in the accompanying drawings. Specific details are set forth in order to provide a thorough understanding of the invention. It will be apparent to one skilled in the art that the invention may be practiced without using some of the implementation details set forth herein. It should also be understood that well known operations have not been described in detail in order to not unnecessarily obscure the invention. Embodiments are described below, by way of example only, with reference to FIGS. 1-14.

In accordance with an aspect of the present disclosure there is provided a method for managing Internet domain names, comprising: receiving a plurality of domain name definitions for a plurality of domains at a management server of a domain registry administering the plurality of domains; associating at the management server one or more domain names of the plurality of domain name definitions with a tag defining a characteristic associated with a domain name for performing a transaction in relation to the one or more domain names; receiving at the management server a request from a registrar to perform the transaction associated with at least one domain name of the one or more domain names; determining the tag associated with the at least one domain name provided in the transaction request; retrieving the characteristic defined by the associated tag; and performing the transaction request associated with the at least one domain name based on the characteristic defined by the tag.

In accordance with another aspect of the present disclosure there is provided a system for managing Internet domain names, comprising: a domain management database comprising a plurality of domain name definitions and a plurality of tags, each of the plurality of tags defining a characteristic associated with a domain name for performing transactions in relation to the domain name; and a management server operably coupled with the domain management database, the management server implemented by a domain registry administering domain names of the plurality of domain name definitions, the management server comprising functionality to associate and store one or more domain names to a tag of the plurality of tags in the domain management database, wherein when a request is received from a registrar to perform a transaction associated with at least one domain name of the one or more domain names the domain management database is parsed to determine the tag associated with the at least one domain name provided in the transaction request and the characteristic defined by the associated tag is used to perform the transaction request on the at least one domain name.

In accordance with another aspect of the present disclosure there is provided a non-transitory computer readable medium having instructions stored thereon, which when executed by a processor of an Internet domain name management server configure the processor to perform: receiving a plurality of domain name definitions for a plurality of domains at the management server of a domain registry administering the plurality of domains; associating at the management server one or more domain names of the plurality of domain name definitions with a tag defining a characteristic associated with a domain name for performing a transaction in relation to the one or more domain names; receiving at the management server a request from a registrar to perform the transaction associated with at least one domain name of the one or more domain names; determining the tag associated with the at least one domain name provided in the transaction request; retrieving the characteristic defined by the associated tag; and performing the transaction request associated with the at least one domain name based on the characteristic defined by the tag.

The private organizations operating each individual gTLD are very often commercial entities looking to generate revenue and make a profit. While registries have historically charged their registrars the same price for all domain names regardless of their value, these organizations operating the registries would like full control and flexibility over the sale of their domain names. For example, these registries for the new gTLDs may wish to charge their registrars increased premium prices for valuable domain names (much like how registrars charge their registrants increased prices for valuable domain names). Similarly, registries may also wish to charge their registrars discount prices for domain names as part of various promotions and/or bulk registrations, and for defined periods of time. They may want to offer these promotions only to certain registrars. Registries may also want to promote and/or block the registration of certain domain names. However, despite these needs, registries are limited by the existing technology which provides limited administration and management flexibility. The present disclosure describes methods and systems comprising a platform that can be used by registry operators and registrars to manage domain names and registry operations through a web based portal.

The platform comprises an object-oriented approach to domain name management, though a person of skill in the art may understand that a platform with similar functionality could be designed using alternative approaches.

FIG. 1 shows an overview of a domain name management system. The domain names are managed using a user-interfacing platform hosted on a server 130 of the registry operator 100. The registry operator 100 provides management for a defined set of domains. A registrant 122, for example the owner of a website 120, may request via one of a plurality of registrars 124a, 124b (collectively 124) a domain name to be used by the website host 120. The registrar 124 can then inquire with the registry operator 100 for the availability of a domain or group of domains. When a transaction associated with a domain takes place, such as when a domain is purchased, the registry associates a registrant 122 and a host address 120 with the domain. An entry for the DNS 190 can be generated by the registry operator 100 to reflect the transaction associated with the domain. The DNS 190 is updated from the Registry using EPP 170 or Web Portal. The DNS is updated first on the root DNS server 190 for the Registry and then propagated to client DNS servers 192/194. When a user 110 requests access to a particular domain name the DNS1 194 resolves the IP address to the website host IP address 120.

The functionality of the server 130 may comprise one or more processors 130 or distributed across multiple servers. The server 130 is operably coupled to a domain management database 140 for storing domain names, tagging information, etc., as will be described in more detail herein. While a single server 130 and domain management database 140 is shown, any number of servers or databases could be implemented to perform the same functionality as described herein. The server 130 may also comprise a processor used for carrying out methods that will be described herein, and may also be coupled to a memory comprising instructions that are readable by the processor and which instruct the processor what actions to perform. The processor 132 is coupled to a memory 133 containing instructions for providing domain management 135, an Extensible Provisioning Protocol (EPP)—application programming interface (API) 136 and tag generation and management 137. The server 130 also provides a web interface to allow access by authorized and registrars 124a, 124b, for example. The registry 130 is accessible through the Internet 180.

The registry operator 100 is responsible for administering and managing the registry comprising the domain names, which is stored on the domain management database 140. Using the platform hosted on server 130, a registry operator 100 and registrars 124 can more easily perform domain name pricing models, event management, registrar promotions, etc. This can be achieved using 'tags' 142, which can have various metadata associations and characteristics such as event types, registrars, time period, functions, pricing, etc., as will be further described herein which are used for determining how domains and prices are administered. Accordingly, with this arrangement the management of domain names is achieved remotely by the server 130 hosting the platform; the domain names are not hard-coded in database tables, eliminating the need to hire back-end management and furthermore allowing for improved flexibility to manage domain names, including the capabilities to allow for pricing options.

A registrant 122, such as a website owner, may inquire with a registrar 124a to perform an event or transaction associated with a domain name. Registrars 124 can help registrants 122 manage their domains and provide necessary information to the registry operator 100 to record who is the registrant of the domain name and the associated IP address. The events performed on a domain entry may be for example but not limited to: creating a domain, renewing a domain, transferring a domain between registrants or registrars, restoring a domain, deleting a domain, etc. The registrar 124 must perform this event within the registry stored on the domain management database 140, where the communication between the registrar 124 and registry 130 takes place by accessing the platform using the EPP-API interface 136 and sending an EPP command, or using the network interface 134. Registrars must ensure that EPP requests meet EPP standards as defined by the following Request for Comment (RFC) documents: RFC 5730, RFC 5731, RFC 5732, and RFC 5733. The platform parses all incoming requests using a validating XML (Extensible Markup Language) parser that reads the XML and validates XML syntax before passing the request to the business logic. The system 100 may also have further capabilities such as being able to auto-recapture registered domains on expiry, and allowing for domains to be reserved for later fulfillment without completing the entire registration process.

The domain names may additionally be associated into bundles by the tags. A bundle is a group of domains that by registry policy are required to be managed together. In most cases they are required to be owned by a single owner. The registry policies will determine what domains are grouped into a bundle. For example policy based bundles could be based on (but not limited to): character mapping of variant domain names to the canonical base name; misspellings of domain names; synonyms or related words to the domain; order of words, phrases or numbers (also referred to as domain name spinning); and domain names of similar meaning but in multiple languages.

Bundles based on a character mapping can be examined in the following example. The Registry has decided to accept domain names in a repertoire that is different than regular ASCII encoding. In this case they will accept French Canadian characters such as, é, ë, â, è, â, à, æ, ô, œ, ù, û, ü, ç, î, ï and ÿ. This allows the users of the registry system to register domain names containing those characters such as www.grâce.fury, préside.fury, etc. These are called Internationalized Domain Names, or IDNs. Each variant of the character mapping relates to a base character. So the base character of ù, û, ü would be u. The system allows the Registry to automatically generate all available variants to any domain name and associate those domains to a bundle.

For example fury.ca bundle would include fùry.ca, fûry.ca, füry.ca, fûry.ca, etc.

By associating a character based policy bundle to a Tag, the Registry User is easily able to manage infinite number of Internationalized Domain Names (IDN) with one single Bundle.

Another example of Associated Bundles could be based on homographs, where the Registry User enters a single domain name and programmatically generated homographs would be automatically created in the associated bundle. For example the user may enter GOOGLE.COM and a bundle is created that contains G00GLE.COM and other related homographs. (Note the difference in OO vs 00).

Additionally with the rise in Internationalized Domain Names homographic bundles will also contain variations of visually similar domain names using Unicode characters from other languages. For example domains with a Greek alpha α look very similar to a Latin a. Homographic bundles can be attached to Block Tags in order to limit the homoglyph attack vector where a malicious user tries to register homographs of popular domains in order to execute a form of spoofing attack.

Figure 2:
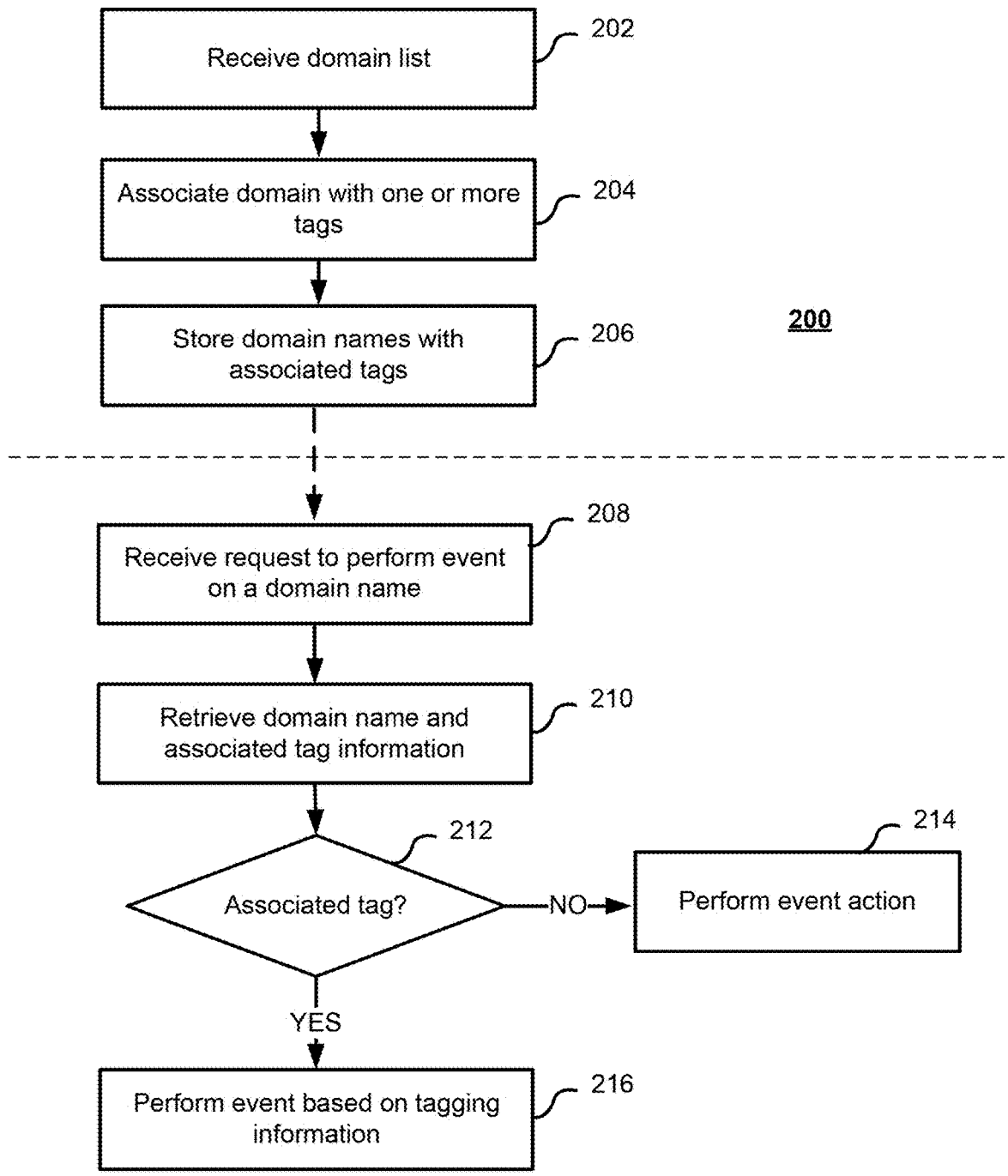
FIG. 2 shows a general method flow to manage domain names.

FIG. 2 shows a general method flow 200 of how the system 100 may be used to manage domain names. A registry operator accesses the platform and uploads/couples the registry containing domain names and associated information to the server 130 in domain management database 140 using the platform. The domain list is received at, or provided to, the server 130 (202) and the registry may be stored in the domain management database 140, for example. The registry operator can access the platform and assign a domain name to one or more tags (204). The domain names may be also assigned to the tags automatically by a policy definition. Alternatively the tags may be associated with a domain during creation or updating of the domain name database. The domain names and tags are stored (206). At a subsequent time the server 130 receives the request and updates the domain management database 140 accordingly (204). As will be described in more detail herein, when a tag is assigned various associated information is also provided. The tagging information associated with the one or more domain names is similarly stored in the domain management database 140.

When a registrar 124a subsequently wants to request an event on a domain name, they access the platform and the request is received by server 130 (208). The server 130 accesses the domain management database 140 to retrieve the domain name of interest and any tags/tagging information associated with the domain name (210). The server 130 checks if there is one or more tags are associated with the domain name (212), and if not (NO at 212) the requested event is performed (214). If there is an associated tag with the domain name (YES at 212), the server 130 performs the event based on the tagging information (216), as will be further described herein.

Figure 3:
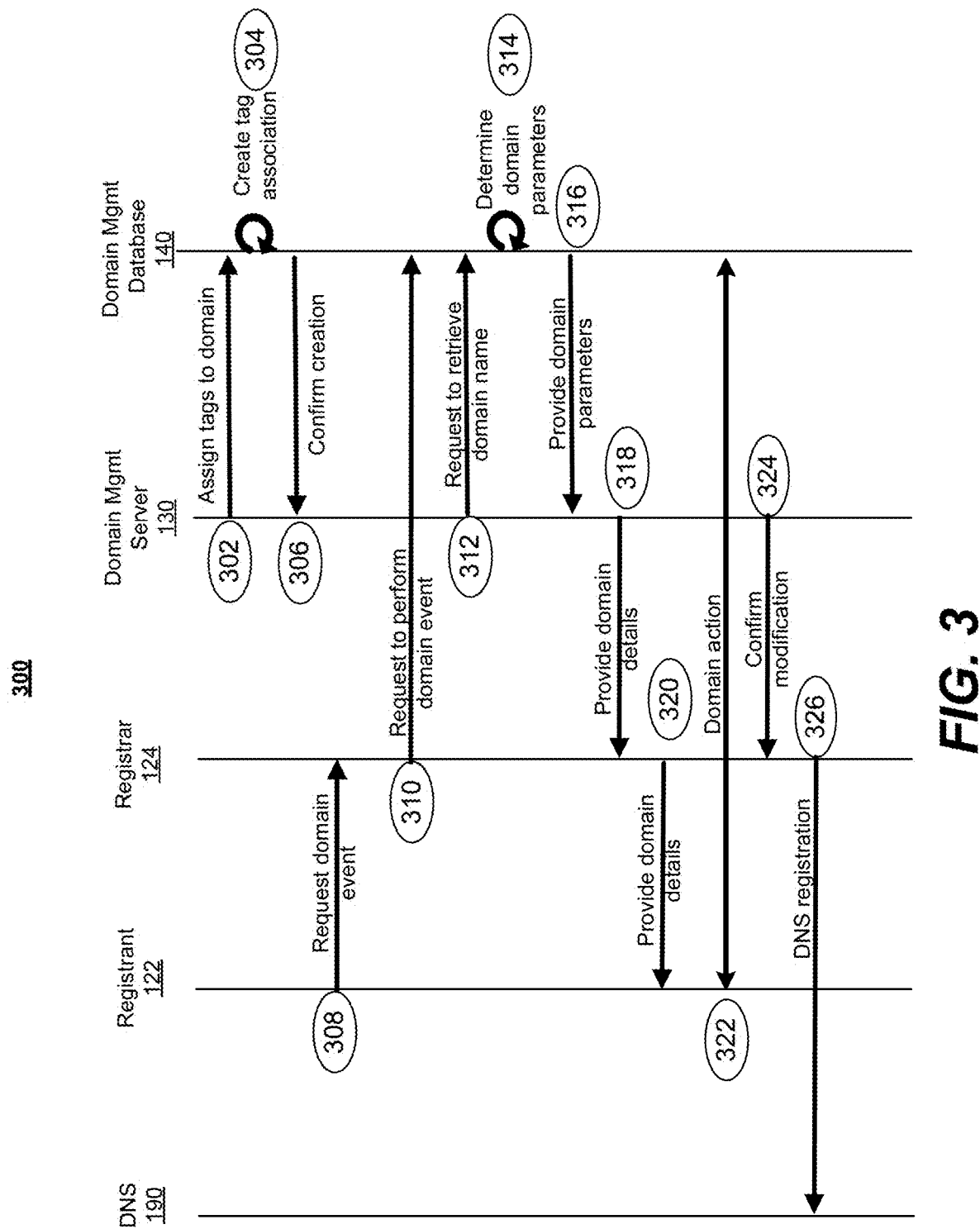
FIG. 3 depicts a communication flow of the system.

FIG. 3 depicts a communication flow 300 showing how communication between the various components of the system occurs. The registry operator sends communication to the server 130 to assign a domain name to one or more tags (302). The server 130 assigns the domain/bundle and associated information to the one or more tags stored in the domain management database 140 (304). Confirmation of the association of the domain with one or more tags is generated (306). A registrant 122 may communicate with the registrar 124 to request a domain event or transaction to be performed (308). The registrar 124 sends communication to the server 130 requesting an event be performed on a domain name (310). This could be an EPP request, for example. The request may be initiated by the registrant 122 communicating with the registrar 124, for example requesting a domain create action; or the registrar 124 may also make the request themselves, for example to perform a domain renew action where the registrant 122 has set up an auto-renew for the domain name. The server 130 sends communication to the domain management database 140 to retrieve the domain name(s) of which the event was requested to be performed on (312). From the database 140 domain parameters or characteristics associated with the domains are determined from the associated tags (314) and provided back to the server 130 (316). The server 130 interprets the parameters generated from the tagging information and communicates to the registrar 124 if the event has been performed, the cost to perform the event, etc. (318). The registrar 124 communicates to the registrant 122 and may associate additional parameters with the domain details before providing them to the registrant (320). A domain action such as purchasing the domain can be performed (322) and communicated between the registry, registrar and registrant. Confirmation is provided by the server 130 to the registrar 124 and/or registrant 122 that the action has been completed. The DNS can then be updated by the registrar (326) utilizing EPP or a web portal to access a domain registry system associated with the particular domain.

In some cases, as will be discussed herein, the tag associated with a domain may require the server 130 to get permission from the registry operator 130 which would entail additional communication or actions not shown in FIG. 3.

Figure 4:
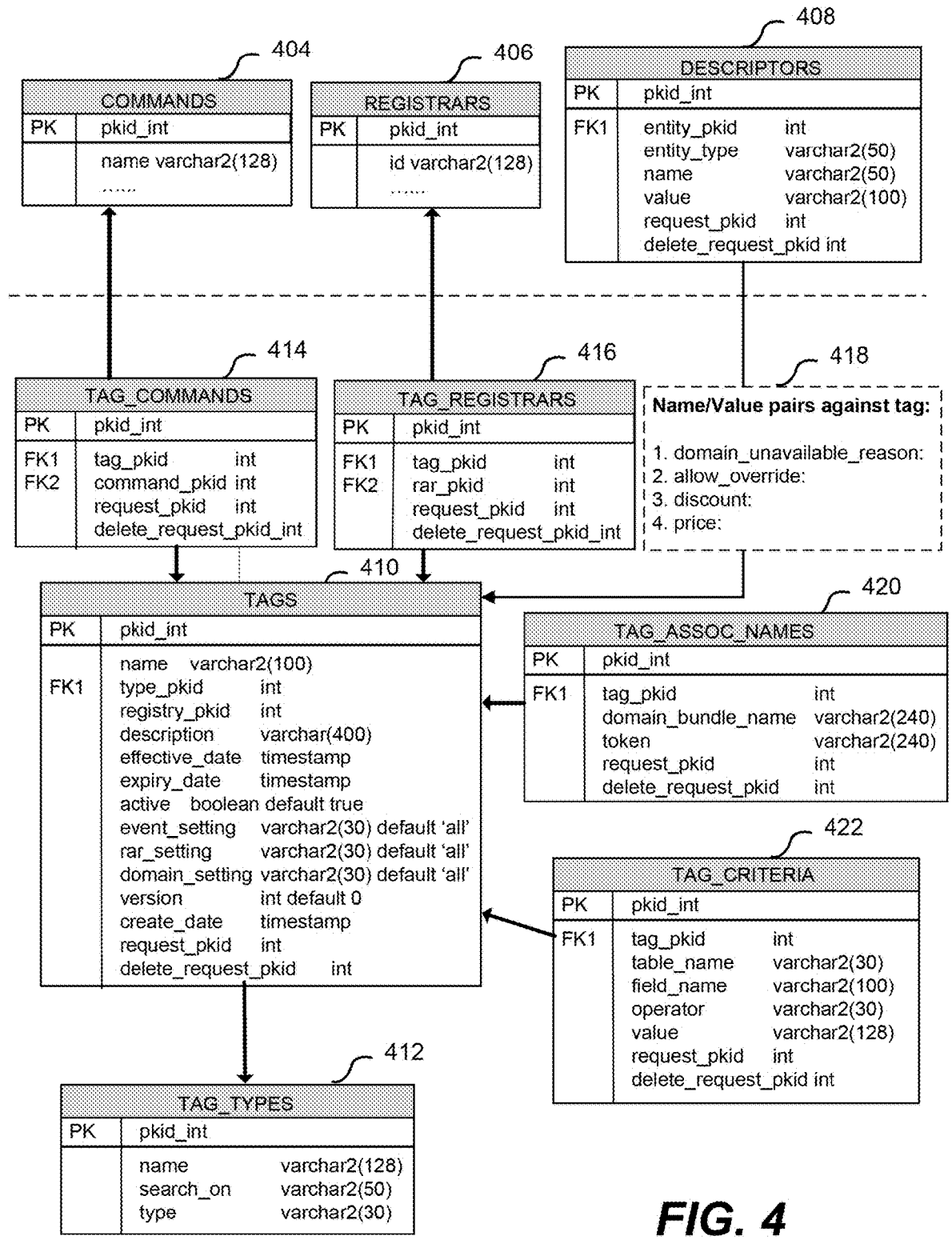
FIG. 4 shows a domain management database schema.

FIG. 4 shows domain management database schema. Implementation of this schema structure with the tagging functionality provides an improvement to existing hard-coded registries. The domain management database 140 provides various tables used to apply tags to domain names. Some of the tables would be existing to most registries such as COMMANDS 404 containing event information, REGISTRARS 406 containing a list of Registrars that could access the Registry, and DESCRIPTORS 408 containing information to be associated with the domain names.

The domain management database 112 further comprises several tables used to tag domain names. These include TAGS 410 which stores the common data in a tag, TAG_TYPES 412 which stores all the tag types implemented in the system, TAG_COMMANDS 414 which stores the relationship between tag and events, TAG_REGISTRARS 416 which stores the relationship between tag and registrars, TAG_ASSOC_NAMES 420 which stores the relationship between tag and domain/bundle names, and TAG_CRITERIA 422 which stores the relationship between tag and its pattern. Name/value pairs 418 can be defined against the tag, such as for example defining if the reason if the domain is unavailable, if an override is allowed, a discount for the domain, the price for the domain or a markup for the domain.

Non-limiting sample for the TAGS table 410 is provided below. Additional data is stored in the Descriptors table 408.

--- event_setting/ rar_setting/ domain_name_setting defines the relationship with commands/ registrars/ domain_name separately;

event_setting is based on the tag's type with possible values listed on n/a or selected, where n/a means that the tag will not apply any commands and where selected means that the tag will apply all commands which are listed on the table of "tag_commands";

rar_setting is based on the tag's type with possible values listed on all or selected, where all means that the tag will apply all registrars which are listed on the table of "registrars" and where selected means that the tag will apply all registrars which are listed on the table of "tag_registrars"; and domain_setting is based on the tag's type with possible values listed on selected or pattern, where selected means that the tag will apply all domain names which are listed on the table of "tag_domain_names" and where pattern means that the tag will apply all existing domains which name follows the pattern listed on the table of "tag_criteria".

---

The TAG_CRITERIA table 422 stores the relationship between tag and its pattern if the tag's domain_setting be set as "pattern." Examples of tags and some of their functionalities are shown in Table 1. One of ordinary skill in the art will readily envision other tags that offer useful functionality without departing from the scope of this disclosure.

TABLE 1

Sample List of Tag Types

| Type Name | Command Applied | Registrar Applied | Domain Name Applied | Domain LengthOfTerm Applied | Type | Editable By UI | Search Page |
|---|---|---|---|---|---|---|---|
| Group | na | all | selected(tag_domain_names) | | Operation | Y | Y |
| Block | All selected | all selected | selected(tag_domain_names) pattern(tag_criteria) Bundle (Bundle_name) | | Operation | Y | Y if selected |
| Price (Premium) | all selected | all selected | selected(tag_domain_names) pattern(tag_criteria) Bundle (Bundle_name) | | Finance | Y | Y |
| Discount | all selected | all selected | selected(tag_domain_names) pattern(tag_criteria) Bundle (Bundle_name) | | Finance | Y | Y if selected |

TABLE 1-continued

Sample List of Tag Types

| Type Name | Command Applied | Registrar Applied | Domain Name Applied | Domain LengthOfTerm Applied | Type | Editable By UI | Search Page |
|---|---|---|---|---|---|---|---|
| Fee | selected | all selected | | Pattern (tag_criteria) | Finance | N | N |

Generally, Group tags are used to associate a number of domain names for organization purposes. Premium tags are used to override default prices by applying a price increase. Discount tags are used to override default prices by applying discounts. Block tags are used to restrict actions from being carried out with specific domain names. When a Registry assigns a domain name to a tag they can also fill out associated tagging information and characteristics that may include but not be limited to: a name of the tag, a pricing model of the tag, a registry event affecting the tag, registrars affected by the tag, domain names that will be affected by the tag, and a length of time that the tag applies. In assigning the domain name to a tag, specific information is required, for example a Group Tag require at least a name; a Block Tag requires a Name, an Event, a Registrar, a Time Period; and a Discount and Premium requires a Name, an Event, a Registrar, a Time Period and the Discount/Premium.

The functionality of the tags are further disclosed with respect to embodiments of method flows described below. Note that the method flows do not necessarily have to be performed in the order depicted (for example a description of the tag is not necessarily required before selecting which domain names the tag applies to), but instead these method flows are used to illustrate an example that a Registry operator 100 could use the platform to apply tags to domains. The information from these methods are received at the server 130 that receives information from the registry operator through the platform.

Figure 5:
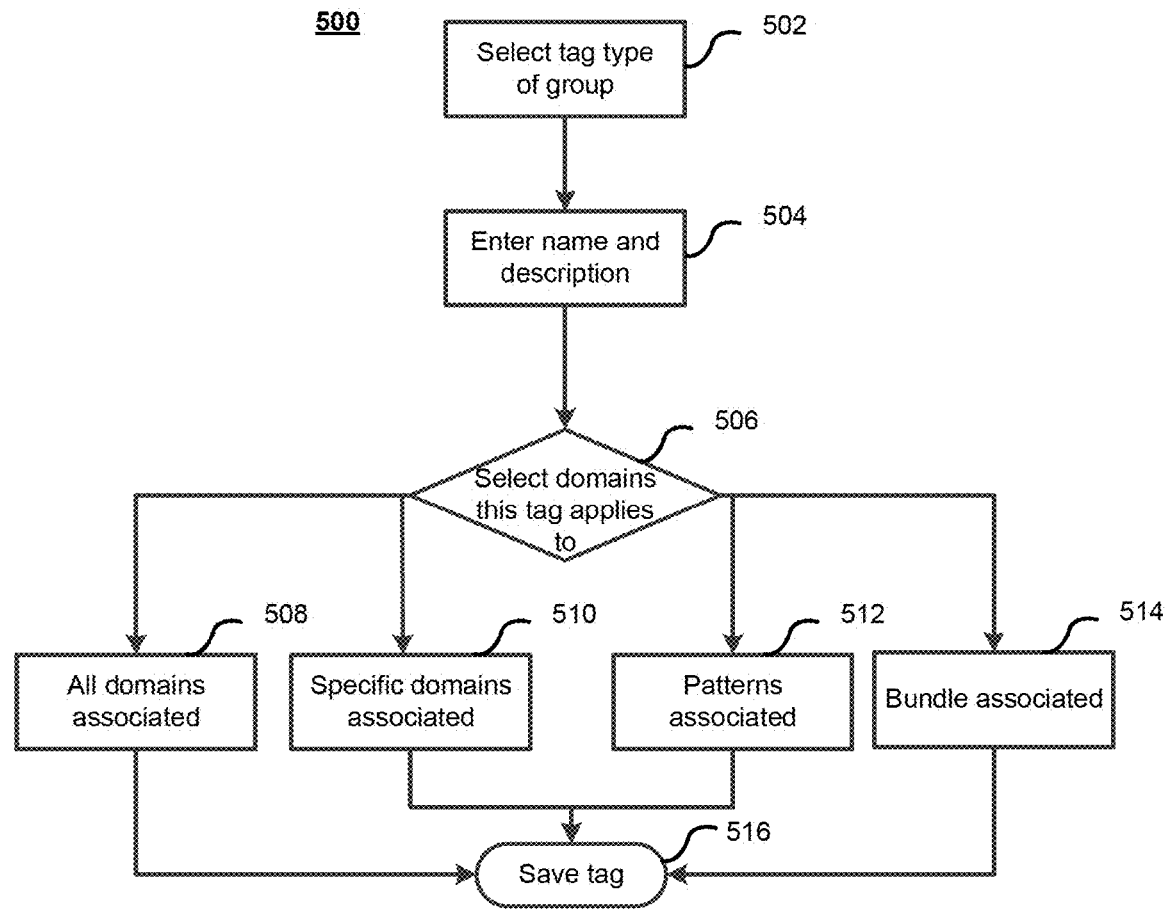
FIG. 5 depicts a method flow for applying a group tag to a plurality of domain names.

FIG. 5 depicts a method flow 500 for applying a group tag to a plurality of domain names. As disclosed in FIG. 1, a registry operator accesses the Registry domain name management platform 100 hosted on server 130. The registry operator selects the tag type as group (502) from a list of possible tag types stored on the domain management database 140. The registry operator enters the name and description of the group tag (504) and selects the domains that the tag applies to (506) from the domains stored on domain management database 140. For example, the registry may select that the group tag applies to all domains (508) stored on the domain management database 140 corresponding to the specific registry, it could apply to associated domains (510) entered manually by the registry operator or selected from the domains stored on the domain management database 140, or it could apply to domain names based on a pattern (512), for example all domain names with the term "coffee" in it. The domain names may also be bundled by associated tags (514). The tag is saved (516) and has been applied to the domains selected. As described previously, further information may also be provided, such as the length of time that the tag applies.

Figure 6:
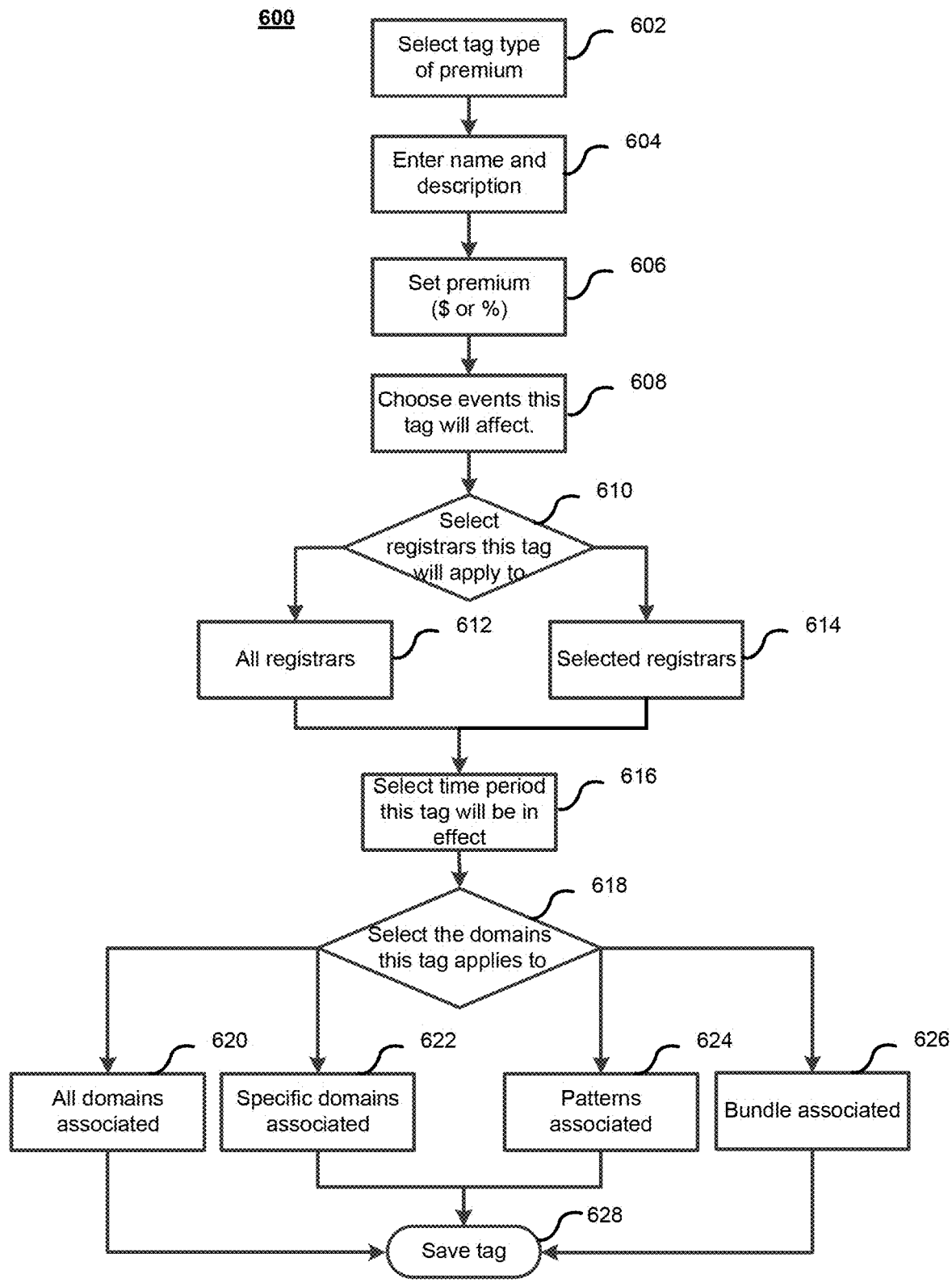
FIG. 6 depicts a method flow for applying a premium tag to one or more domain names.

FIG. 6 depicts a method flow 600 for applying a premium tag to one or more domain names. As disclosed in FIG. 1, a registry operator accesses the registry domain name management platform hosted on server 130. The registry operator selects the tag type as premium (602) from a list of possible tag types stored on the domain management database 140. The registry operator enters the name and description of the premium tag (604). The registry operator sets the premium (606), as the premium price applied by the tag may either be applied as a dollar or percentage amount. The registry operator chooses events that this tag will affect (608) from the domain management database 140. The events may comprise any action that the registry is capable of performing, including but not limited to creating a domain, renewing a domain, transferring a domain between registrants or registrars, restoring a domain, deleting a domain, etc. The registry operator selects registrars that this tag affects (610), which may be all registrars (612) stored in the domain management database 140, or selected registrars (614) from the tagging information database 140. The registry operator 100 can also select a time period that the tag will be in effect (616), and as before with the group tag the registry operator can select the domains that the tag applies to (618). The registry operator may select the tag to apply to all domains (620) stored on the domain management database 140 corresponding to the specific registry, to associated domains (622) selected from the domains stored on the domain name database 140, or it could apply to domain names based on a pattern (624). The domain names may also be bundled by associated tags (626).The tag is saved (628) and has been applied to the domains selected.

Figure 7:
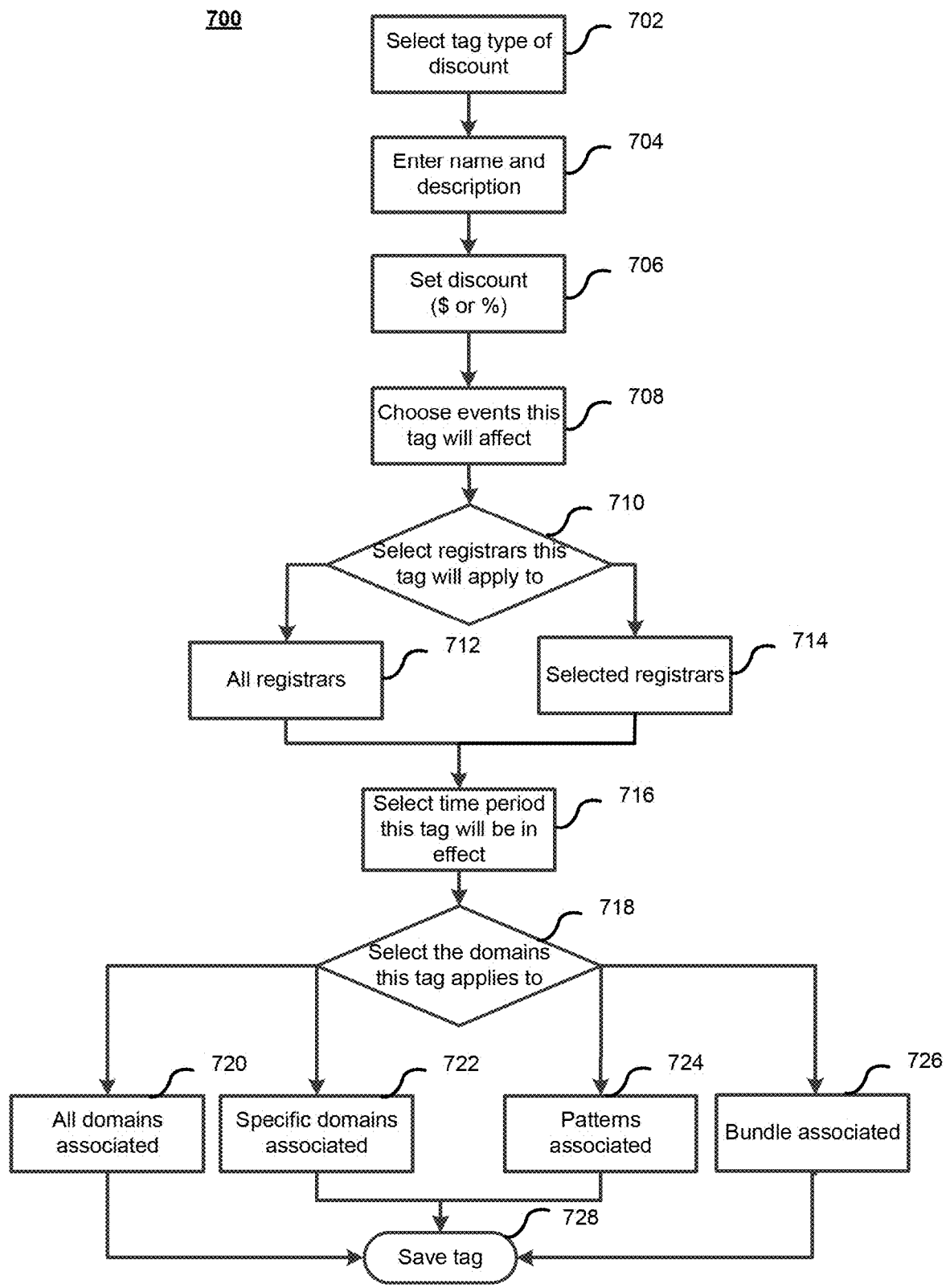
FIG. 7 depicts a method flow for applying a discount tag to one or more domain names.

FIG. 7 depicts a method flow 700 for applying a discount tag to one or more domain names. This method is similar to applying a premium tag as described in FIG. 6 except that a discount is being applied. As disclosed in FIG. 1, a registry operator accesses the registry domain name management platform hosted on server 102. The registry operator 100 selects the tag type as discount (702) from a list of possible tag types stored on the domain management database 140. The registry operator enters the name and description of the discount tag (704). The registry operator 108 sets the type of discount (706), as the discount price applied by the tag may either be applied as a dollar or percentage amount. The registry operator chooses events that this tag will affect (708) from the domain management database 140. The events may comprise any action that the registry is capable of performing, including but not limited to creating a domain, renewing a domain, transferring a domain between registrants or registrars, restoring a domain, deleting a domain, etc. The registry operator selects registrars that this tag affects (710), which may be all registrars (712) stored in the domain management database 112, or selected registrars (714) selected from the domain management database 140. The registry operator can also select a time period that the tag will be in effect (716), and the registry operator can select the domains that the tag applies to (718). The registry operator may select the tag to apply to all domains (720) stored on the domain management database 140 corresponding to the specific registry, to associated domains (722) entered manually by the registry operator on the domain management database 140, or it could apply to domain names based on a pattern (724). The domain names may also be bundled by associated tags (726). The tag is saved (728) and has been applied to the domains selected.

Figure 8:
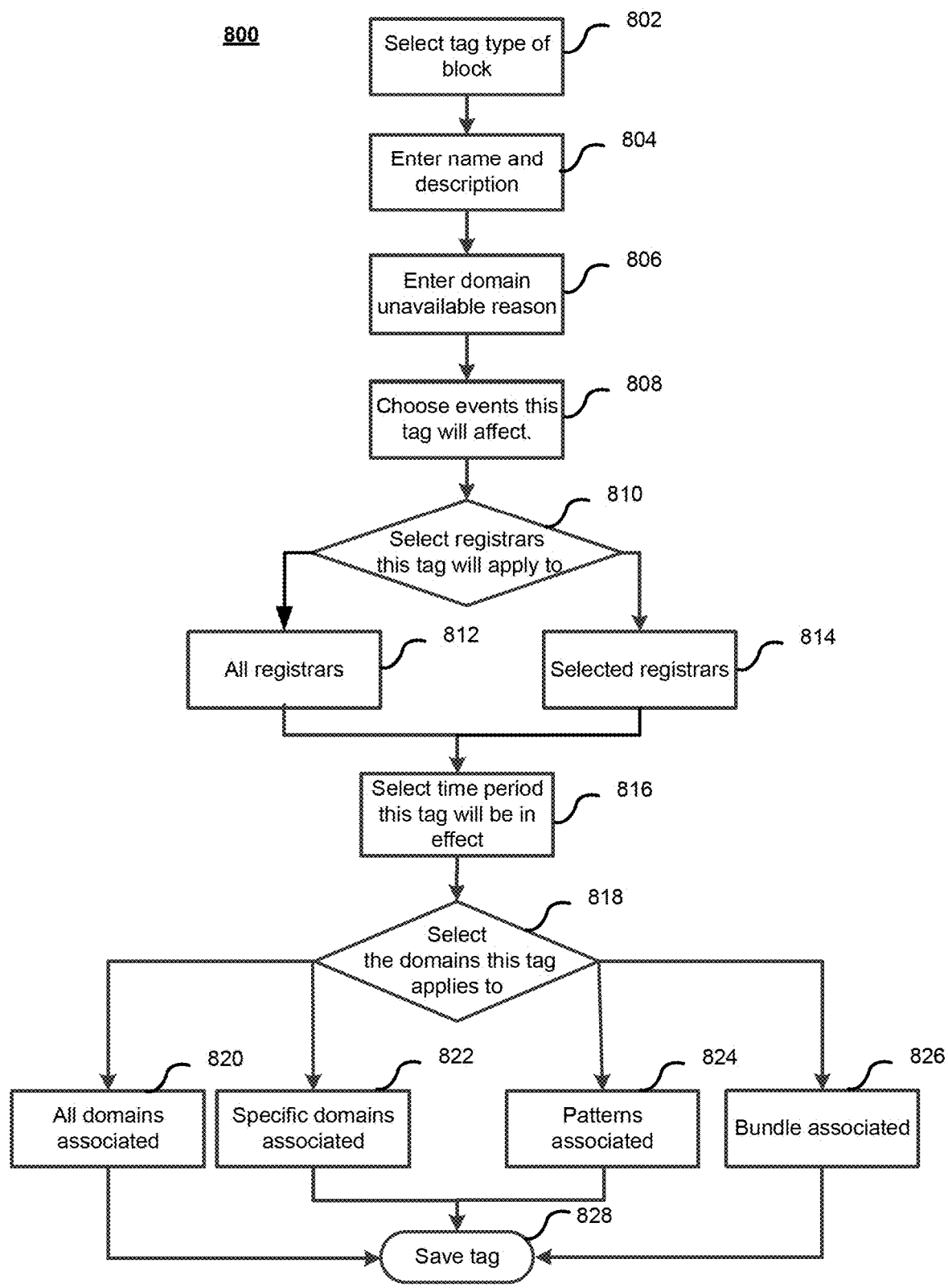
FIG. 8 depicts a method flow for applying a block tag to one or more domain names.

FIG. 8 depicts a method flow 800 for applying a block tag to one or more domain names. This method is similar to applying a premium or discount tag, but produces a different end result based on the functionality of the tag. As disclosed in FIG. 1, a registry operator accesses the registry domain name management platform hosted on server 130. The registry operator selects the tag type as block (802) from a list of possible tag types stored on the domain management database 140. The registry operator enters the name and description of the block tag (804). The registry operator may choose to enter a reason that the domain name is blocked or unavailable (806). This allows the registry operator to customize a message which could later be presented to registrars 124 upon trying to perform the blocked event. In addition, this message could be displayed in the public WHOIS (an Internet protocol that is used to query databases to obtain information about the registration of a domain name or IP address) for registrants to be able to see directly which domains are available from the registry. The capabilities of pushing this customizable message out through the WHOIS directly from this tag would be a benefit to registries and is an embodiment of this disclosure.

The registry operator chooses events that this tag will affect (808) from the domain management database 140. The events may comprise any action that the registry is capable of performing, including but not limited to creating a domain, renewing a domain, transferring a domain between registrants or registrars, restoring a domain, deleting a domain, etc. The registry operator selects registrars that this tag affects (810), which may be all registrars (812) stored in the domain management database 140, or selected registrars (814) from the tagging information database 140. The registry operator 108 can also select a time period that the tag will be in effect (816), and the registry operator can select the domains that the tag applies to (818). The registry may select the tag to apply to all domains (820) stored on the domain management database 140 corresponding to the specific registry, to associated domains (822) entered manually by the registry operator in the domain name database 140 which can be programmatically or policy generated, or it could apply to domain names based on a pattern (824). The domain names may also be bundled by associated tags (826). The tag is then saved (828) and will apply to the affected domains.

Existing registry systems do allow for a list of domains that are blocked, however that list is normally coded at the table level as previously described and is often not accessible to the end user (i.e. the registry) for modification. The block functionality disclosed above not only applies to the action of creating domains to be sold to registrars, but may also be applied to inhibit the action of any or all events associated to a domain, including but not limited to renew, transfer, restore, delete, etc., which is a benefit to registry systems and an embodiment of this disclosure.

Another embodiment of the block tag is that there is an override ability that may be set to the tag. Domains associated to a block tag that has an override ability are put into a queue where the registry operator is able to approve/reject the domain/event. This allows customized workflows for any domains. If a registrar selects a domain that is blocked with an override, they are notified of the block but would still be allowed to continue. The registry can choose to approve or reject the event by carrying out the override option or not. Without the override ability set to the tag, the registrar is simply unable to perform the action in question.

Figure 9:
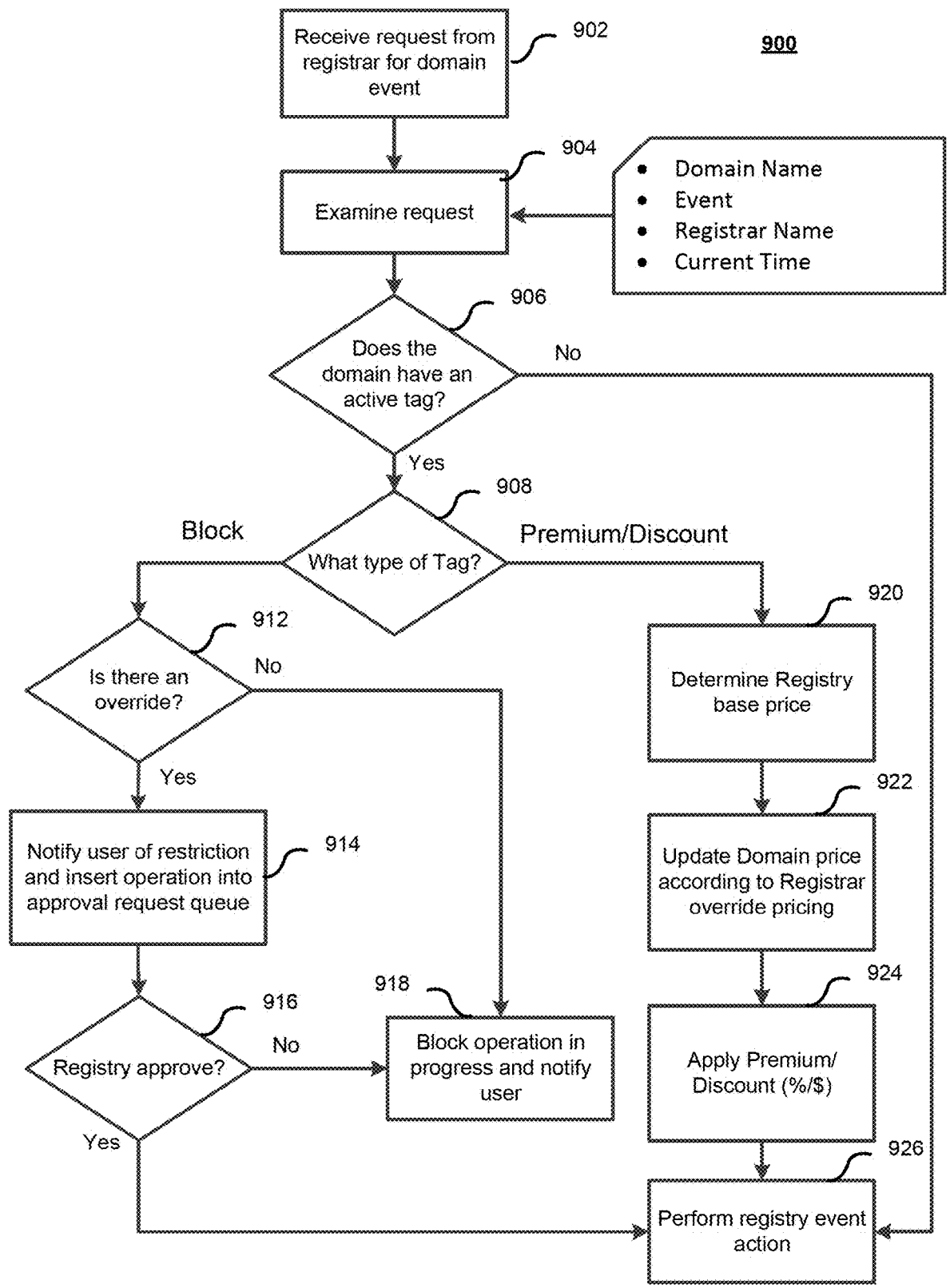
FIG. 9 depicts a method flow for a domain event request.

FIG. 9 depicts a method flow 900 of what takes place at the server 130 when a domain event or transaction request is received from a registrar 124. The request is received by the server 130 for a domain event from a registrar 124 (902). Any event requested to be performed (for example, creating/updating/deleting domains) is evaluated against existing tags, where the tags and their characteristics may have been established by the appropriate registry operator using one of the method flows described in FIGS. 5 to 8. The request is examined (904) to determine information such as the domain name, the event, the registrar name, and the current time. The server 130 determines if the domain name has an existing tag (906) by accessing the domain management database 140. If there is no existing tag (NO at 906), then the server 130 performs the registry event action as requested (926). If there is an existing tag (YES at 906), then the server 130 determines what type of tag and characteristic function will be applied (908). If the tag is a Premium/Discount tag (Premium/Discount at 908) the registry base price is determined (920). The domain price is then updated according to registrar override pricing (922). A premium or discount (% or $) is then applied to the tagged domains (924). the registry event is then performed (926) thereafter.

If the tag is a block tag (Block at 908), the blocking functionality restricts the transaction from being performed and the server 130 determines if there is an override option (912). If there is not an override (NO at 912) the operation is blocked and the registrar 124 is notified (918). The registrar may be presented with a reasoning that the request was blocked as described with reference to FIG. 8. If there is an override option (YES at 912) the registrar 124 is notified and the operation of performing the event is inserted into an approval request queue (914) that must be approved by the registry operator (916). An e-mail or notification is provided from the server 130 to a registry support user confirming approval. If the registry operator 100 does not approve of the operation (NO at 916) the operation is blocked (918). If the registry operator does approve the operation (YES at 916) the registry event is then performed (926).

In an embodiment it may be envisioned that there is a domain name with a block tag having an override option as well as a premium tag. For example, if the registry chooses to override the block tag then they want to charge a premium for that domain. In such a scenario after the registry operator approves the operation (YES at 916) the domain information is updated with appropriate data (910) and then the registry action is performed (920).

Figure 10:
FIG. 10 shows a user interface for managing tags associated with domains.
Figure 11:
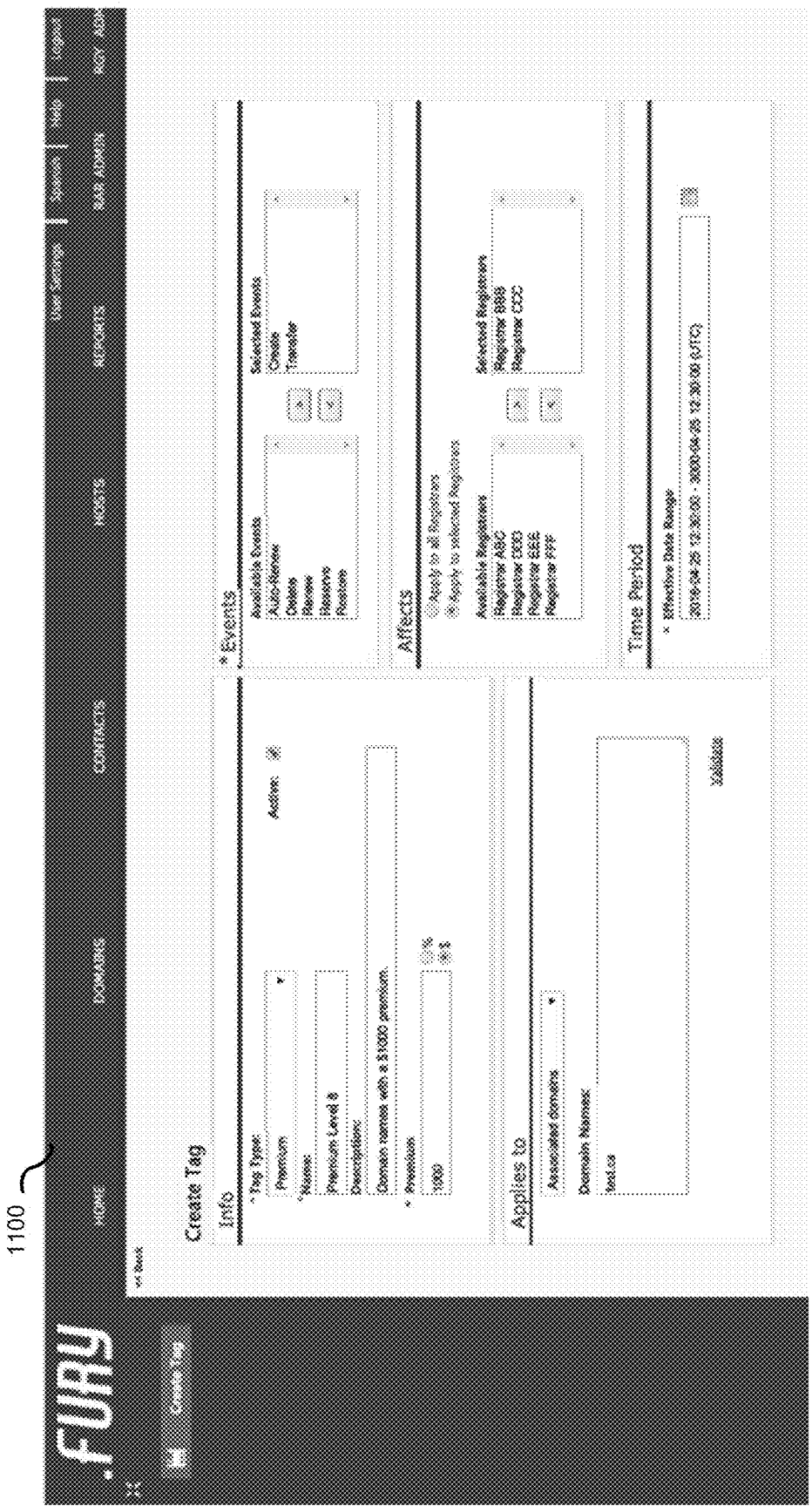
FIG. 11 shows a user interface for a premium price for a domain create event.
Figure 12:
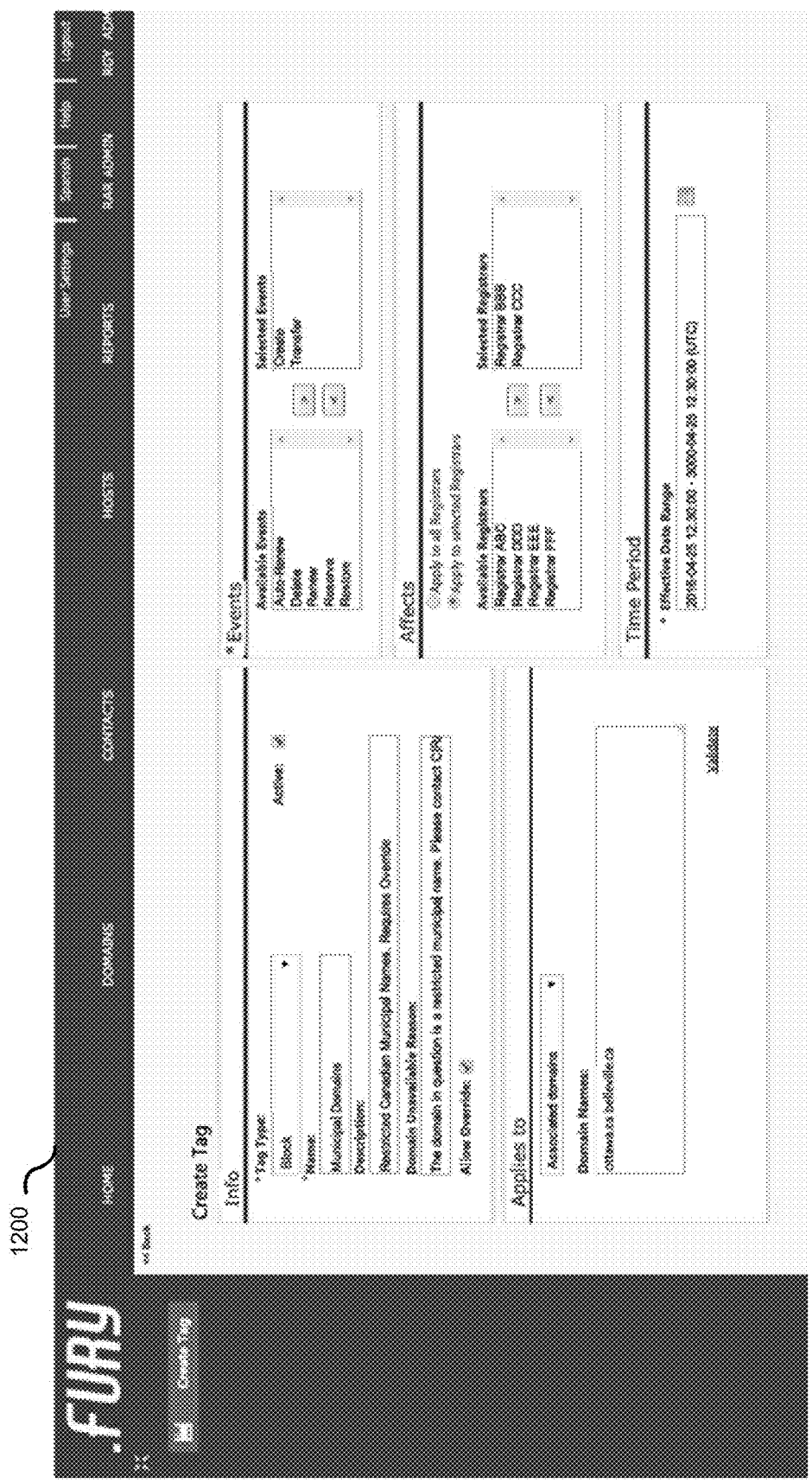
FIG. 12 shows user interface for creating a block tag type.
Figure 13:
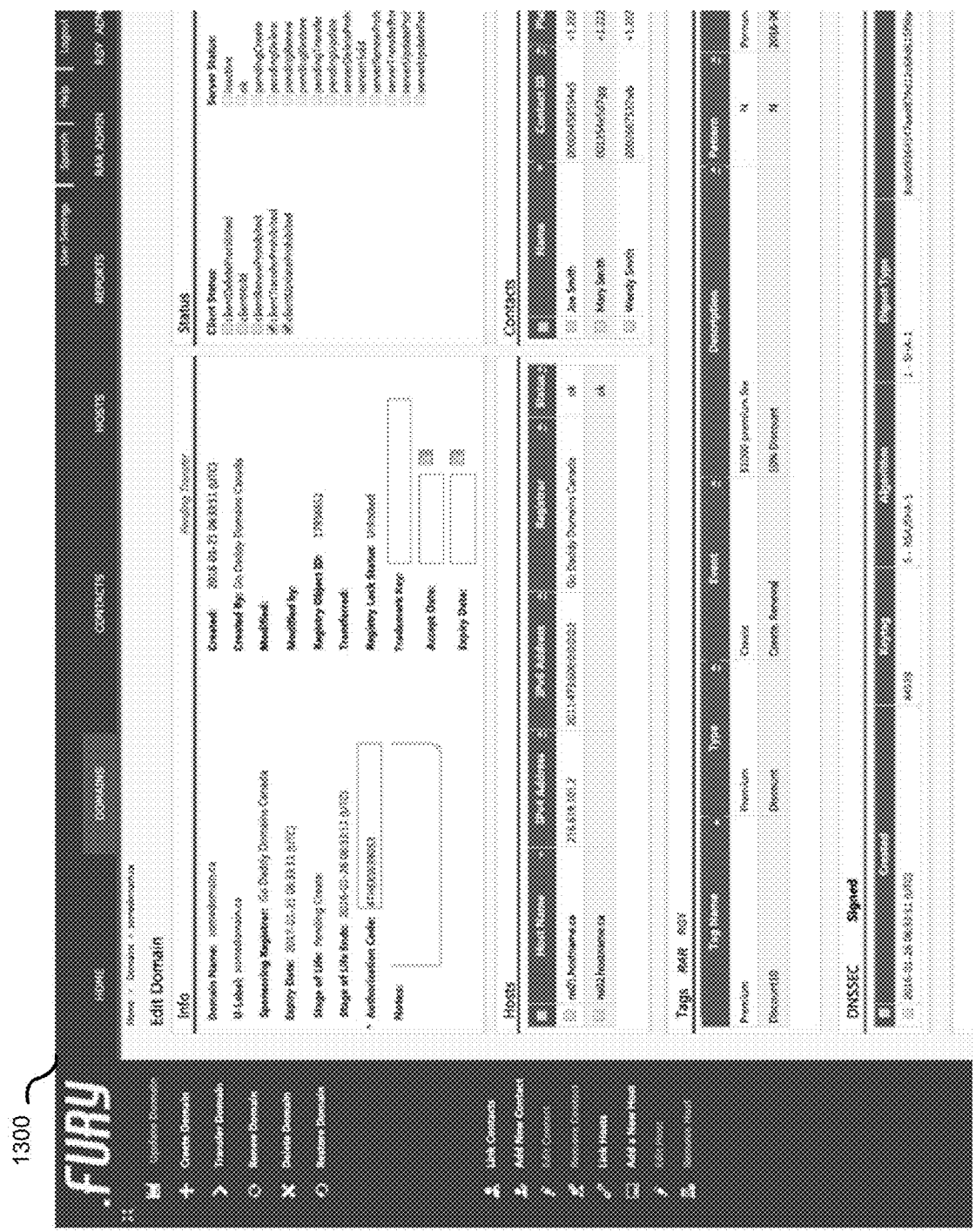
FIG. 13 shows user interface for editing domain information.

Various screenshots of what a user may see at the user interface when accessing the platform are shown in FIG. 10 thru 13. FIG. 10 shows a UI 1000 for managing tags associated with domains. FIG. 11 shows an example of UI 1100 for a premium price for a domain create event. FIG. 12 shows UI 1200 for creating a block tag type. FIG. 13 shows a UI 1300 for creating a domain definition.

The tag types described herein are tags seen by the users accessing the platform, however the ability to manage all forms of event driven workflow allows for additional tags to be developed. Such tags that may be envisioned include tags for managing Base Registry Pricing, Override Registrar Pricing, Registrar Taxes, and more. These could be developed for use by the host server but hidden from the platform user. The tags described in this disclosure are wholly extensible in that not only can new tags be easily created but new types of tags can be created with minimum development effort programmatically. Therefore the entire Registry platform is simple to extend and maintain.

Other embodiments of tags not explicitly described above but which could be readily implemented is that events may be managed based on transaction count. For example, a registrar could receive a discount on the first 100 domains managed, and then a larger discount on the next 100 domains. Also, discounts could be performed based on "batches" or groups of domains such that one domain could be purchased for a certain amount (ex. $10), but if five domains were purchased from the same batch then this would effectively cost less than buying individually (ex. $30). The length of time that a tag applies to domain names could also be managed by the host server such that sales campaigns can run un-attended by the registry operators themselves.

Figure 14:
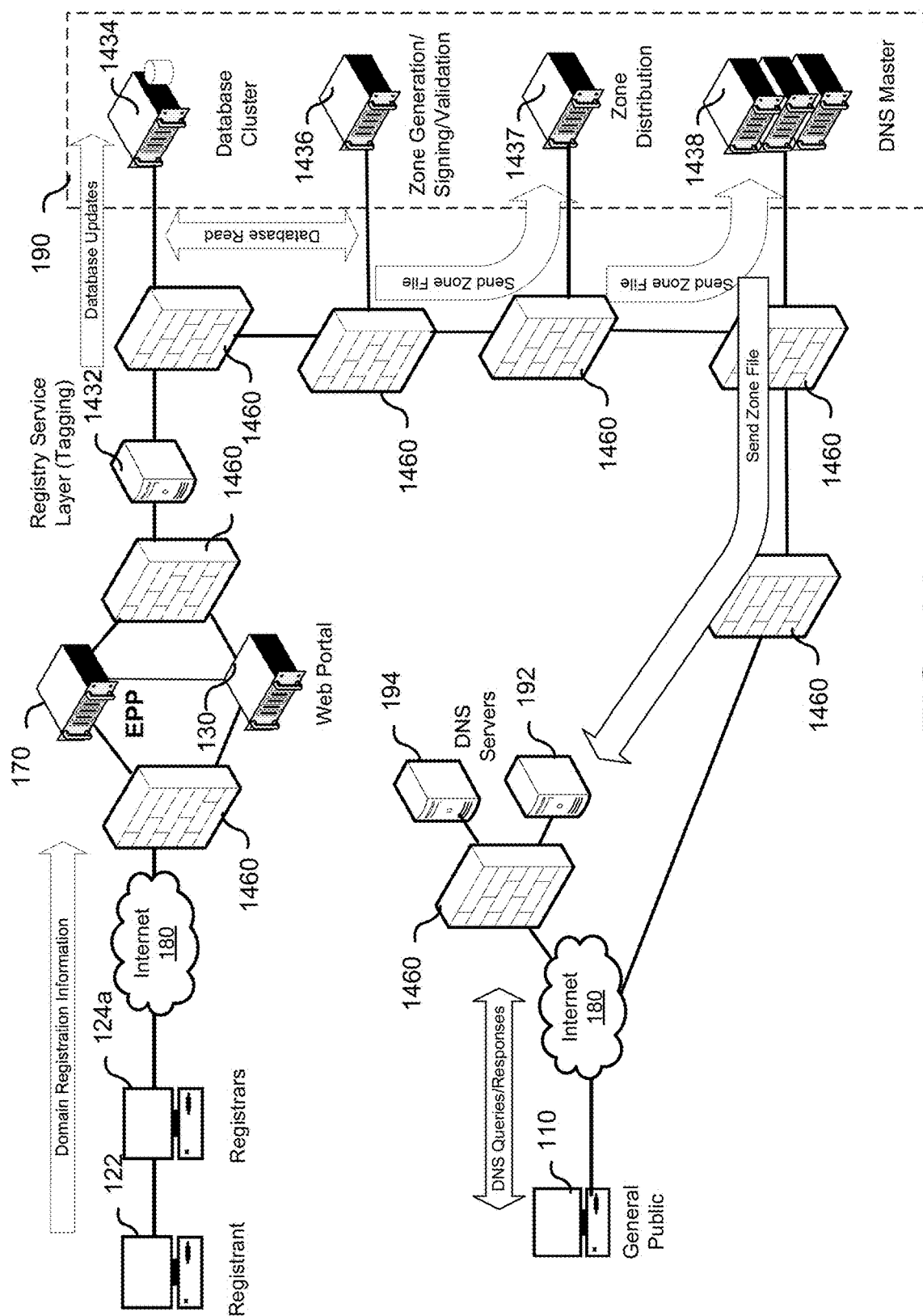
FIG. 14 shows a system diagram for DNS operation utilizing domain tagging.

FIG. 14 shows a system diagram for DNS operation utilizing domain tagging. A registrar 124 issues a request for information or an action against a domain. Once the request for a domain event comes in through EPP 170 or the Web Portal, the Registry Service Layer 1432 acts on the request and assigns related tags to the domain. The database 1434 is updated with the request which is in turn passed into the zone file generation 1436 and through the zone distribution 1437 and DNS master server 1438 and is sent on to the public-facing DNS servers 194 192. One or more firewalls 1460 may be providing to partition or secure devices or aspects of the system.

It would be appreciated by one of ordinary skill in the art that the system and components shown in FIGS. 1-14 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

In various embodiments devices and nodes described herein are implemented using one or more components or modules to perform the steps corresponding to one or more methods, for example, has generation, transmitting, processing, and/or receiving steps. Thus, in some embodiments various features are implemented using components or modules. Such components or modules may be implemented using software, hardware or a combination of software and hardware. In some embodiments each component or module is implemented as an individual circuit with the device or system including a separate circuit for implementing the function corresponding to each described component or module. Many of the above described methods or method steps can be implemented using machine executable instructions, such as software, included in a machine readable medium such as a memory device, e.g., RAM, USB, CD, DVD, hard disc, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and/or associated hardware, to perform one or more or all of the steps of the above-described method(s). Some embodiments are directed to a device including a processor configured to implement one, multiple or all of the steps of one or more methods of the invention.

Numerous additional variations on the methods and apparatus of the various embodiments described above will be apparent to those skilled in the art in view of the above description. Such variations are to be considered within the scope.

The invention claimed is:

1. A method for managing Internet domain names, comprising:

receiving a plurality of domain name definitions for a plurality of domain names at a management server of a domain registry administering the plurality of domain names;

associating at the management server, in real-time in response to user input from a registry operator through a web-based platform, a subset of the plurality of domain names with a tag, each having an associated domain name definition from the plurality of domain name definitions, the tag defining an associated characteristic for performing a transaction in relation to respective domain names;

receiving at the management server a request from a registrar to perform the transaction associated with at least one domain name of the subset of the plurality of domain names;

determining the tag associated with the at least one domain name provided in the transaction request;

retrieving the characteristic defined by the associated tag; and performing the transaction request associated with the at least one domain name based on the characteristic defined by the tag, without performing a transaction on any other domain name in the subset of domain names associated with the tag, wherein performing a modification of the characteristic defined by the associated tag applies to the subset of the plurality of domain names associated with the tag.

2. The method of claim 1, wherein the characteristic defines a transaction type that can be performed on the respective domain names in the subset of domain names.

3. The method of claim 2, wherein the transaction type comprises any one or more of: registering the domain name, renewing the domain name, transferring the domain name, restoring the domain name, and deleting the domain name.

4. The method of claim 1, wherein the characteristic defines a function to be applied when performing the transaction request, the function comprising any one of: a premium to be applied to a price of the domain names, a discount to be applied to the price of the domain names, and a block to restrict the transaction from being performed.

5. The method of claim 4, wherein the characteristic further defines one or more registrars that the function should be applied to when performing the transaction requested by the one or more registrars.

6. The method of claim 4, wherein the characteristic further defines a time period during which the function is to be applied when performing the transaction.

7. The method of claim 1, wherein the transaction associates ownership of the at least one domain name to a registrant.

8. The method of claim 7, wherein the transaction generates an entry for a domain name server associated with the at least one domain name, and the method further comprises updating the domain name server with the generated entry.

9. The method of claim 1, wherein the transaction request further comprises one or more of: a transaction type to be performed on the at least one domain name, a name of the registrar from which the transaction request originated from, and a time of the transaction request.

10. The method of claim 1, wherein the subset of domain names associated with the tag are selected as domain names associated with a group tag.

11. The method of claim 1, wherein the subset of domain names associated with the tag are selected based on a pattern of the domain names.

12. The method of claim 1, wherein the subset of domain names associated with the tag are selected as a bundle of domain names.

13. A system for managing Internet domain names, comprising:
   a domain management database server comprising a plurality of domain name definitions for a plurality of domain names, and a plurality of tags, each of the plurality of tags defining an associated characteristic for performing a transaction in relation to associated domain names; and
   a management server communicatively coupled with the domain management database server, the management server implemented by a domain registry administering the plurality of domain names of the plurality of domain name definitions, the management server comprising a processor configured to:
   associate and store, in real-time in response to a user input from a registry operator through a web-based platform, a subset of the plurality of domain names with a tag of the plurality of tags in the domain management database server,
   wherein when a request is received from a registrar to perform a transaction associated with at least one domain name of the subset of domain names, the processor is configured to parse the domain management database server to determine the tag associated with the at least one domain name provided in the transaction request, and the processor is configured to perform the transaction request on the at least one domain name using the characteristic defined by the associated tag, without performing a transaction on any other domain name in the subset of domain names associated with the tag, and
   wherein the processor is further configured to perform a modification of the characteristic defined by the associated tag that applies to the subset of the plurality of domain names associated with the tag.

14. The system of claim 13, wherein the characteristic is defined by the domain registry as a transaction type that can be performed on the domain name associated with the tag.

15. The system of claim 14, wherein the transaction type comprises any one or more of: registering the domain name, renewing the domain name, transferring the domain name, restoring the domain name, and deleting the domain name.

16. The system of claim 13, wherein the characteristic is defined by the domain registry as a function to be applied when performing the transaction request on the domain name, the function comprising any one of: a premium to be applied to a price of the domain name, a discount to be applied to the price of the domain name, and a block to restrict the transaction from being performed.

17. The system of claim 13, wherein the transaction associates ownership of the at least one domain name to a registrant.

18. The system of claim 17, wherein the management server generates an entry for a domain name server associated with the one or more domain names, and updates the domain name server with the generated entry.

19. The system of claim 13, wherein the management server comprises one or both of an extensible provisioning protocol (EPP)-application programming interface (API) and a network interface for receiving the request from the registrar.

20. A non-transitory computer readable medium having instructions stored thereon, which when executed by a processor of an Internet domain name management server configure the processor to perform:
   receiving a plurality of domain name definitions for a plurality of domain names at the management server of a domain registry administering the plurality of domain names;
   associating at the management server, in real-time in response to user input from a registry operator through a web-based platform, a subset of the plurality of domain names with a tag, each having an associated domain name definition from the plurality of domain name definitions, the tag defining an associated characteristic for performing a transaction in relation to respective domain names;
   receiving at the management server a request from a registrar to perform the transaction associated with at least one domain name of the subset of the plurality of domain names;
   determining the tag associated with the at least one domain name provided in the transaction request;
   retrieving the characteristic defined by the associated tag; and
   performing the transaction request associated with the at least one domain name based on the characteristic defined by the tag, without performing a transaction on any other domain name in the subset of domain names associated with the tag,
   wherein performing a modification of the characteristic defined by the associated tag applies to the subset of the plurality of domain names associated with the tag.

* * * * *